(12) United States Patent
Lutz

(10) Patent No.: US 7,481,040 B2
(45) Date of Patent: Jan. 27, 2009

(54) EXHAUST-GAS HEAT EXCHANGER, IN PARTICULAR EXHAUST-GAS COOLER FOR EXHAUST GAS RECIRCULATION IN MOTOR VEHICLES

(75) Inventor: Rainer Lutz, Steinheim (DE)

(73) Assignee: BEHR GmbH & Co. KG, Stuttgart (DE)

( * ) Notice: Subject to any disclaimer, the term of this patent is extended or adjusted under 35 U.S.C. 154(b) by 8 days.

(21) Appl. No.: 10/572,480

(22) PCT Filed: Aug. 31, 2004

(86) PCT No.: PCT/EP2004/009687

§ 371 (c)(1),
(2), (4) Date: Aug. 16, 2006

(87) PCT Pub. No.: WO2005/028848

PCT Pub. Date: Mar. 31, 2005

(65) Prior Publication Data

US 2007/0051095 A1    Mar. 8, 2007

(30) Foreign Application Priority Data

Sep. 18, 2003    (DE) ................................ 103 43 698

(51) Int. Cl.
*F02M 25/06*    (2006.01)
(52) U.S. Cl. ............................ 60/278; 60/280; 60/298; 60/299; 60/302; 60/320; 60/605.2; 123/568.11; 123/568.12; 123/568.18

(58) Field of Classification Search ................... 60/278, 60/280, 292, 295, 298, 299, 302, 311, 320, 60/321, 324, 599, 605.2, 568.12, 568.17, 60/568.18, 568.19; 123/568.11, 568.12, 123/568.17, 568.18, 568.19
See application file for complete search history.

(56) References Cited

U.S. PATENT DOCUMENTS

| | | | |
|---|---|---|---|
| 4,359,863 A | 11/1982 | Virk et al. | |
| 4,381,590 A | 5/1983 | Nonnenmann et al. | |
| 4,521,947 A | 6/1985 | Nonnenmann et al. | |
| 5,785,030 A * | 7/1998 | Paas | 60/278 |
| 6,851,414 B2 * | 2/2005 | Gao et al. | 123/568.12 |
| 6,944,947 B1 | 9/2005 | Damsohn et al. | |
| 7,025,042 B2 * | 4/2006 | Gray, Jr. | 123/435 |
| 7,237,531 B2 * | 7/2007 | Atkinson | 123/399 |
| 7,281,531 B1 * | 10/2007 | Fulton et al. | 123/568.17 |
| 2005/0039729 A1 | 2/2005 | Rosin et al. | |

FOREIGN PATENT DOCUMENTS

| | | |
|---|---|---|
| DE | 29 24 592 A1 | 1/1981 |
| DE | 35 43 011 A1 | 6/1987 |
| DE | 195 40 683 A1 | 5/1997 |
| DE | 199 06 401 C1 | 8/2000 |
| DE | 100 54 221 A1 | 5/2001 |
| DE | 102 03 003 A1 | 8/2003 |

(Continued)

*Primary Examiner*—Binh Q. Tran
(74) *Attorney, Agent, or Firm*—Foley & Lardner LLP

(57) ABSTRACT

The invention relates to an exhaust-gas heat exchanger, in particular an exhaust-gas cooler (1) for exhaust-gas recirculation (AGR) in motor vehicles equipped with channels, through which exhaust gas flows. According to the invention, a catalyst (8), in particular an oxidation catalyst, is connected upstream of the exhaust-gas heat exchanger (1).

17 Claims, 2 Drawing Sheets

FOREIGN PATENT DOCUMENTS

| | | | |
|---|---|---|---|
| EP | 0 677 715 A1 | 10/1995 | |
| JP | 6-066208 A | 3/1994 | |
| JP | 08338320 A * | 6/1995 | ............... 60/278 |
| JP | 10-266902 A | 10/1998 | |
| JP | 2000-038962 A | 2/2000 | |
| JP | 2000-045881 A | 2/2000 | |
| JP | 2000-146465 A | 5/2000 | |
| JP | 2000-249003 A | 9/2000 | |
| JP | 02000146465 A * | 5/2006 | ............... 60/278 |

* cited by examiner

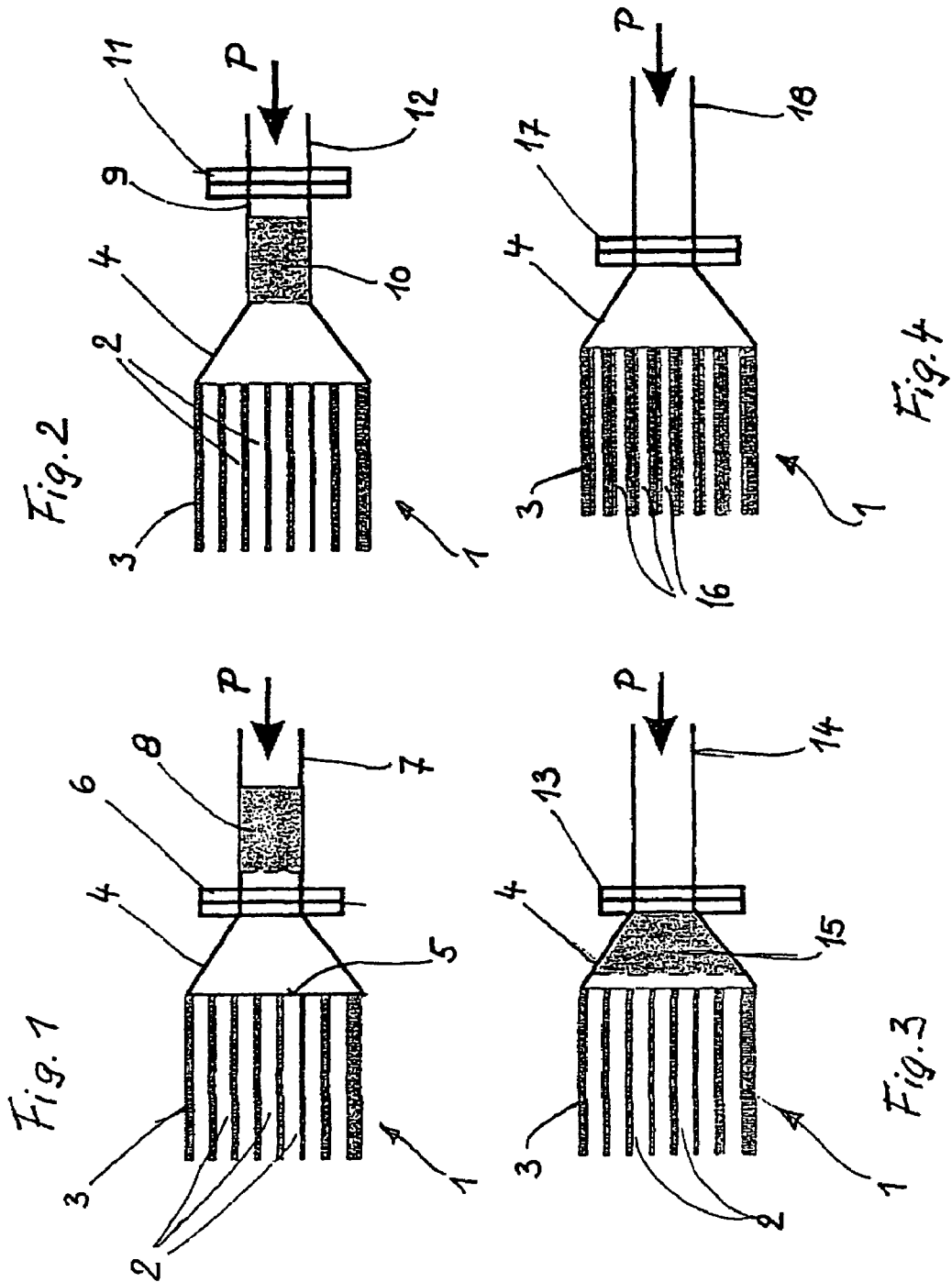

EXHAUST-GAS HEAT EXCHANGER, IN PARTICULAR EXHAUST-GAS COOLER FOR EXHAUST GAS RECIRCULATION IN MOTOR VEHICLES

The invention relates to an exhaust-gas heat exchanger, in particular an exhaust-gas cooler for an exhaust-gas recirculation in motor vehicles, as described in the preamble of patent claim 1.

Exhaust-gas heat exchangers are used on the one hand for heating purposes for warming the coolant and on the other hand for cooling the exhaust gases, i.e. as an exhaust-gas cooler used in the exhaust-gas recirculation in motor vehicles. Exhaust-gas recirculation, known as EGR for short, is used—as is known—to reduce fuel consumption and lower emission levels. Exhaust-gas recirculation systems have been disclosed, for example, by DE-C 199 06 401. One problem with exhaust-gas heat exchangers of this type, in particular exhaust-gas coolers, is the deposition of particulates from diesel exhaust gases in the exhaust-gas passages of the exhaust-gas cooler. Therefore, the Applicant has proposed, in EP-A 677 715 and DE-A 195 40 683, that turbulence-inducing devices, which prevent the deposition of particulates in the exhaust-gas flow, be arranged in the exhaust-gas tubes for exhaust-gas coolers. For this purpose, tabs or elevations, known as winglets, are arranged in a V shape on the inner side of the exhaust-gas passages, these winglets generating specific turbulence in the exhaust-gas flow. Alternatively, fins can also be used for this purpose. However, these measures are insufficient to prevent the deposition of particulates, leading to a reduction in the performance of the associated exhaust-gas heat exchanger, with the result that the exhaust-gas coolers have to be of larger dimensions.

It is an object of the present invention to improve an exhaust-gas heat exchanger, in particular an exhaust-gas cooler of the type described in the introduction, in such a way that deposition of particulates in the exhaust-gas passages is avoided or reduced further.

This object is achieved by the features of patent claims 1 and 2. According to the invention, it is provided that an oxidation catalyst, in particular a diesel oxidation catalyst, is connected to or upstream of the exhaust-gas heat exchanger. According to claim 1, the exhaust-gas heat exchanger has any desired exhaust-gas passages, e.g. disks, while the exhaust-gas heat exchanger described in the further independent claim 2 has a tube bundle comprising exhaust-gas tubes. The exhaust-gas heat exchanger may also have a bypass passage with exhaust-gas valve. The applicant has established that deposition of particulates in the exhaust-gas cooler is linked to the hydrocarbon content of the exhaust gases. In particular, the applicant has been able to establish that the hydrocarbons contained in the exhaust gases condense out on the coolant-cooled inner walls of the exhaust-gas passages or exhaust-gas tubes, and the carbon particulates stick to the inner walls. As a result of a diesel oxidation catalyst being connected into or upstream of the exhaust-gas cooler, the hydrocarbons are oxidized to form carbon dioxide and water on account of the ample oxygen present in the diesel exhaust gas. The unpleasant "tack", caused by the hydrocarbon condensate, is therefore eliminated in a propitious way. This has the advantage that fewer particulates are deposited on the inner walls of the exhaust-gas passages and stick to them. The conduction of heat and the passage of heat through the exhaust-gas passages or exhaust-gas tubes are thereby improved.

Diesel oxidation catalysts, known as DOCs for short, are known in the exhaust system of motor vehicles. Catalysts of this type have a metallic or ceramic honeycomb body with a multiplicity of fine exhaust-gas passages which are coated with a catalytic substance, e.g. a precious metal, such as platinum. In the presence of the catalyst, the hydrocarbons are oxidized with an excess of oxygen in the exhaust gas to form carbon dioxide and water. The structure of catalysts of this type, for example with a matrix of stainless steel, is described in documents in the name of the Applicant, DE-A 29 24 592 and DE-A 35 43 011. The metal support comprises, for example, a smooth strip and a corrugated, helically wound strip which is soldered or welded after the winding operation. Then, this honeycomb body is coated with a catalytic substance using known methods. The applicant has adopted this technology and transferred the diesel oxidation catalyst from the exhaust system into the exhaust-gas recirculation and combined it with an exhaust-gas cooler, thereby achieving a surprisingly positive effect.

In an advantageous configuration of the invention, the oxidation catalyst is arranged in an exhaust-gas recirculation line (EGR line), which for its part is connected to the exhaust-gas heat exchanger, advantageously via a flange; other connections, such as a V clip, a sliding seat or other known tube connections from the prior art are also possible. The oxidation catalyst is therefore designed as a separate component which is inserted, for example welded, into the EGR line at a suitable location upstream of the exhaust-gas heal exchanger.

According to a further advantageous configuration of the invention, the oxidation catalyst is integrated in the exhaust-gas heat exchanger, i.e. is part of the exhaust-gas heat exchanger. This allows this integrated assembly to be prefabricated and inserted into the EGR line, thereby facilitating assembly.

In a further advantageous configuration of the invention, the oxidation catalyst is arranged directly upstream of the inlet connection piece, in particular in a tube section which is connected to the EGR line by means of a flange; in this case too, other connections such as those mentioned above are possible. The inlet connection piece of the exhaust-gas heat exchanger is therefore simply lengthened by a piece of tube which accommodates the oxidation catalyst inside it. The result is a simple construction.

In a further advantageous configuration of the invention, the oxidation catalyst is arranged within the inlet connection piece, the latter advantageously being designed as a diffusor. The oxidation catalyst fills the cross section and the majority of the volume of the diffusor, thereby achieving the advantage of an extremely short overall length, since the oxidation catalyst is fitted into an existing space in the exhaust-gas heat exchanger. The through-flow passages of the oxidation catalyst could likewise widen out in the manner of a diffusor, so as to maintain the action of a diffusor for the exhaust gases.

According to a further advantageous configuration of the invention, the passages of the exhaust-gas heat exchanger are coated on the exhaust-gas; side with a catalytic substance, i.e. the oxidation catalyst is therefore integrated in the tube bundle of the exhaust-gas heat exchanger. This represents the most compact design of the combination according to the invention, since there is no need for an additional catalyst support in the form of a metallic or ceramic honeycomb body. This results in a lower pressure drop on the exhaust-gas side as a further advantage.

According to an advantageous configuration of the invention, the exhaust-gas line or parts of the exhaust-gas line which are exposed to the exhaust-gas flow are coated with a catalytic substance upstream of the exhaust-gas heat exchanger, thereby already achieving the advantages of an oxidation catalyst. In this context, a swirl generator, which transports particulates and droplets in the exhaust-gas flow onto the catalytically coated wall of the exhaust-gas line, is advantageous.

According to a further advantageous configuration of the invention, the exhaust-gas heat exchanger is arranged in an EGR line, which is connected to the exhaust pipe of the engine either upstream or downstream of an exhaust-gas turbine. This results in different exhaust-gas temperatures on entry to the exhaust-gas heat exchanger.

Exemplary embodiments of the invention are illustrated in the drawing and described in more detail in the text which follows. In the drawing:

FIG. 1 shows a first exemplary embodiment with catalyst in the EGR line,

FIG. 2 shows a second exemplary embodiment with catalyst upstream of the inlet connection piece, FIG. 3 shows a third exemplary embodiment with catalyst in the inlet connection piece, FIG. 4 shows a fourth exemplary embodiment with catalytically coated exhaust-gas tubes.

Figure 5:
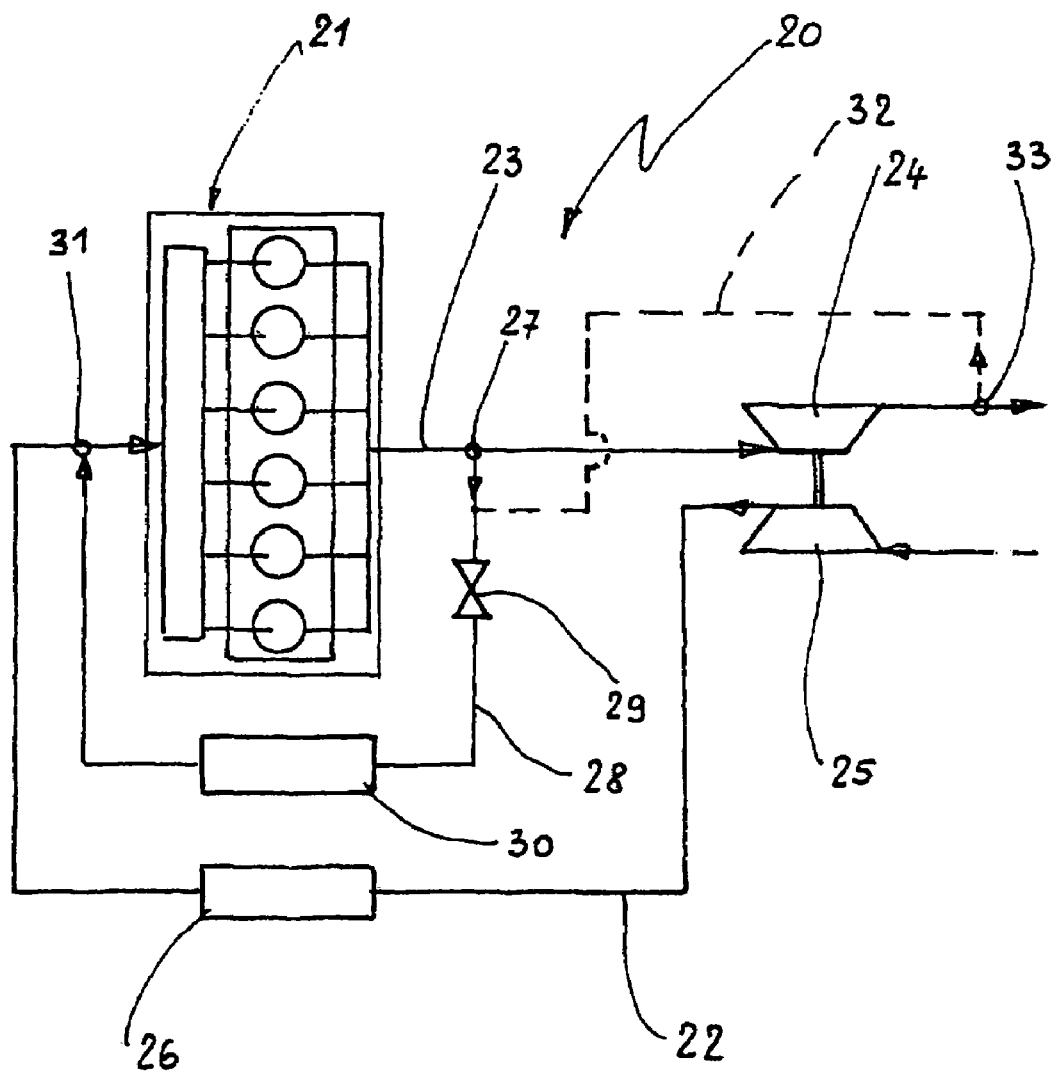
FIG. 5 shows an exhaust-gas recirculation system in the form of a diagrammatic illustration.

FIG. 1 shows an exhaust-gas cooler 1, only half of which is illustrated and which includes a bundle of exhaust-tubes 2 and a housing 3. An inlet connection piece 4, which is designed as a diffusor, adjoins the housing 3. The tubes 2 open out into a tube plate 5, which is only diagrammatically depicted and which is welded to the housing 3. The half of the exhaust-gas cooler 1 which is not illustrated is substantially symmetrical to the half illustrated in the drawing. A flange 6, which connects the exhaust-gas cooler 1 to an exhaust-gas recirculation line 7, referred to below as the EGR line, is secured to the diffusor 4. Exhaust gas flows through the exhaust-gas cooler 1 in the direction indicated by an arrow P, the EGR line 7 forming part of an EGR system—which is known per se—of an internal combustion engine (not shown) of a motor vehicle (cf. also FIG. 5). The exhaust-gas tubes 2 are cooled by a coolant which flows through the housing 3 and is removed from a coolant circuit (not shown) of the internal combustion engine. A diesel oxidation catalyst 8, through which the exhaust gas flows in the direction indicated by arrow P, is arranged above the flange 6 in the direction of flow. The diesel oxidation catalyst 8, referred to below as the catalyst, comprises—as is known from the prior art—a honeycomb body coated with a catalytic substance.

The function of the exhaust-gas cooler 1 in conjunction with the catalyst 8 in an EGR system (cf. also FIG. 5) is as follows: the exhaust gas which has been branched off from the exhaust pipe of an internal combustion engine (not shown) flows through the EGR line 7 into the catalyst 8 in the direction indicated by arrow P. The internal combustion engine is a diesel engine, i.e. the diesel exhaust gases contain, inter alia, hydrocarbons (HC) and oxygen. As they flow through the catalyst 8, the exhaust gases come into contact with the catalytic substance, e.g. a precious metal, such as platinum, which inter alia leads to oxidation of the hydrocarbons by the oxygen. Carbon dioxide ($CO_2$) and water ($H_2O$) are formed from this oxidation. The exhaust gases which then enter the diffusor 4 and the exhaust-gas tubes 2 therefore contain a considerably lower level of hydrocarbons which have the tendency to condense at the inner walls of the exhaust-gas tubes on account of their cooling by coolant. Furthermore, the exhaust gases are laden with carbon particulates which tend to be deposited at the inner walls of the exhaust-gas tubes, a process which is boosted by the presence of hydrocarbon condensate. On account of the reduced proportion of hydrocarbons in the exhaust gases, this strong tendency to deposit particulates is suppressed, since very little if any hydrocarbon condensate is formed. The exhaust-gas cooler 1 therefore operates significantly more cleanly on the exhaust-gas side, and therefore has a higher performance and a longer service life.

FIG. 2 shows a further exemplary embodiment of the invention, specifically an exhaust-gas cooler 1 (in the text which follows, the same reference numerals are used for identical parts) with exhaust-gas tubes 2, housing 3 and diffusor 4. A tube section 9, which accommodates a diesel oxidation catalyst 10, referred to below as the catalyst, adjoins the narrowest point of the diffusor 4. The tube section 9 of the exhaust-gas cooler 1 is connected via a flange 11 to an EGR line 12, through which the exhaust gas flows in the direction indicated by arrow P. The catalyst 10 acts similarly to the catalyst 8 in accordance with the exemplary embodiment shown in FIG. 1.

FIG. 3 shows a third exemplary embodiment of the invention, in the form of an exhaust-gas cooler 1 with exhaust-gas tubes 2 and a housing 3 as well as a diffusor 4. At its narrowest point, the diffusor 4 is connected to an EGR line 14 directly by means of a flange 13, and recirculated exhaust gas flows through this EGR line 14 in the direction indicated by the arrow P. Within the diffusor 4, i.e. an inlet connection piece, the cross section of which widens continuously in the direction of flow, there is arranged a diesel oxidation catalyst 15 which fills the entire cross section of the diffusor 4. Therefore, as they flow through the catalyst 15 in the diffusor 4, the hydrocarbons contained in the exhaust gas are oxidized, so that low-hydrocarbon exhaust gas passes into the exhaust-gas tubes 2, thereby counteracting the deposition of particulates.

FIG. 4 shows a fourth embodiment of the invention having an exhaust-gas cooler 1, a housing 3, a diffusor 4 and a flange 17 for connection to an exhaust-gas recirculation line 18, through which recirculated exhaust gas flows in the direction indicated by arrow P. The exhaust-gas tubes 16 of the exhaust-gas cooler 1 are coated with a catalytic substance—only diagrammatically indicated—which corresponds to the catalytic substance with which the diesel oxidation catalysts 8, 9, 15 are generally coated, i.e. for example with a precious metal, such as platinum. The exhaust gas therefore flows directly into the coated exhaust-gas tubes 16, where the above-described catalytic reaction, i.e. the oxidation of hydrocarbons, takes place. There is in this case no need to install a catalyst in the exhaust-gas cooler or in the EGR line—with the associated pressure loss for the exhaust gas. A separate honeycomb body—as in the previous exemplary embodiments—can therefore be dispensed with here, thereby also eliminating the problems associated with a honeycomb body.

The drawing does not illustrate a further variant, according to which the EGR line and parts of the EGR line which are exposed to exhaust gas are coated with a catalytic substance, in which case a swirl body is also provided for delivering particulates and droplets to the catalytically coated walls.

FIG. 5 diagrammatically depicts an exhaust-gas recirculation system 20 having a diesel engine 21 which is assigned an induction pipe 22 and an exhaust-gas line 23. A turbo charger 25, which is driven by an exhaust-gas turbine 24, compresses the intake air and feeds it to a charge-air cooler 26, is arranged in the induction pipe 22. The exhaust-gas turbine 24 is arranged in the exhaust-gas line 23 and is acted on by the exhaust gases from the diesel engine 21. An exhaust-gas recirculation line 28 with an exhaust-gas recirculation valve 29 and an exhaust-gas heat exchanger 30 is connected to the exhaust-gas line 23 at a branching point 27 and to the induction pipe 22 at the connection point 31. The exhaust gas is therefore recirculated in cooled form. This means that the removal of the exhaust gas at the branching point 27 takes place upstream of the exhaust-gas turbine 24. According to an alternative, represented by an exhaust-gas recirculation line 32 indicated by dashed lines, the exhaust gas is removed at a branching point 33 downstream of the exhaust-gas turbine 24. The exhaust-gas heat exchanger 30 corresponds to the exhaust-gas heat exchanger according to the invention described above, with oxidation catalyst (not shown here). Moreover, the exhaust-gas heat exchanger 30 may also be designed as an exhaust-gas heat exchanger with bypass passage and exhaust-gas bypass valve, for example as described in DE 102 03 003 A1 in the name of the present Applicant.

The invention claimed is:

1. An exhaust-gas heat exchanger comprising,
   an exhaust-gas cooler for an exhaust-gas recirculation in motor vehicles, having passages through which exhaust gas flows, and an inlet connection piece connected on an exhaust-gas side,
   wherein a catalyst is selected from the group consisting of an oxidation catalyst and a diesel oxidation catalyst,
   wherein the catalyst is integrated in the inlet connection piece, and
   wherein the inlet connection piece is a diffusor, and the catalyst fills the diffusor cross section.

2. An exhaust-gas heat exchanger, comprising,
   an exhaust-gas cooler for exhaust-gas recirculation in motor vehicles, having tubes through which exhaust gas flows and around which a coolant flows, the tube ends of which are held in tube plates and which are surrounded by a housing which guides the coolant and to which an inlet connection piece is connected on the exhaust-gas side,
   wherein a catalyst is selected from the group consisting of an oxidation catalyst and a diesel oxidation catalyst, and
   wherein the catalyst is integrated in the inlet connection piece.

3. The exhaust-gas heat exchanger as claimed in claim 1, wherein the catalyst is arranged in an exhaust-gas recirculation line, wherein the exhaust-gas recirculation line is connected to the exhaust-gas heat exchanger.

4. The exhaust-gas heat exchanger as claimed in claim 3, wherein the line, downstream of the catalyst, is connected to the exhaust-gas heat exchanger via a tube connection.

5. The exhaust-gas heat exchanger as claimed in claim 1, wherein the catalyst is integrated in the exhaust-gas heat exchanger.

6. The exhaust-gas heat exchanger as claimed in claim 2, wherein the catalyst is arranged directly upstream of the inlet connection piece.

7. The exhaust-gas heat exchanger as claimed in claim 6, wherein the catalyst is arranged in a tube section comprising a tube connection for connection to an exhaust-gas recirculation line.

8. The exhaust-gas heat exchanger as claimed in claim 2, wherein the inlet connection piece is designed as a diffusor, and the catalyst fills the diffusor cross section.

9. The exhaust-gas heat exchanger as claimed in claim 5, wherein the passages are coated with a catalytic substance on the exhaust-gas side.

10. The exhaust-gas heat exchanger as claimed in claim 3, wherein the exhaust-gas recirculation line is coated with a catalytic substance.

11. The exhaust-gas heat exchanger as claimed in claim 10, wherein a swirl generator in the exhaust-gas recirculation line is connected upstream of the catalyst.

12. An exhaust-gas recirculation system, comprising an internal combustion engine,
    wherein the internal combustion engine comprises a diesel engine comprising an induction pipe comprising a turbo charger and a charge-air cooler, having an exhaust-gas line, which comprises an exhaust-gas turbine, and having an exhaust-gas recirculation line, which is connected to the induction pipe and the exhaust-gas line and includes an exhaust-gas heat exchanger as claimed in claim 2,
    wherein the exhaust-gas recirculation line is connected to the exhaust-gas line upstream of the exhaust-gas turbine, as seen in the direction of flow of the exhaust gas.

13. An exhaust-gas recirculation system comprising an internal combustion engine,
    wherein the internal combustion engine comprises a diesel engine comprising an induction pipe comprising a turbo charger and a charge-air cooler, having an exhaust-gas line, which comprises an exhaust-gas turbine, and having an exhaust-gas recirculation line, which is connected to the induction pipe and the exhaust-gas line and includes an exhaust-gas heat exchanger as claimed in claim 2,
    wherein the exhaust-gas recirculation line is connected to the exhaust-gas line downstream of the exhaust-gas turbine, as seen in the direction of flow of the exhaust gas.

14. The exhaust-gas heat exchanger as claimed in claim 6, wherein the tubes are coated with a catalytic substance on the exhaust-gas side.

15. The exhaust-gas heat exchanger as claimed in claim 3, wherein a structure upstream of the exhaust-gas heat exchanger, as seen in the direction of flow of the exhaust gas is coated with a catalytic substance.

16. The exhaust-gas heat exchanger as claimed in claim 4, wherein the tube connection is a flange.

17. The exhaust-gas heat exchanger as claimed in claim 7, wherein the tube connection is a flange.

* * * * *